(12) United States Patent
Shiraishi

(10) Patent No.: US 7,495,810 B2
(45) Date of Patent: Feb. 24, 2009

(54) IMAGE READER

(75) Inventor: Ryuuichi Shiraishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 807 days.

(21) Appl. No.: 10/322,424

(22) Filed: Dec. 19, 2002

(65) Prior Publication Data

US 2004/0008386 A1 Jan. 15, 2004

(30) Foreign Application Priority Data

Jul. 9, 2002 (JP) ............................ P2002-199641

(51) Int. Cl.
*H04N 1/04* (2006.01)

(52) U.S. Cl. .................. 358/474; 358/498; 358/497; 358/496; 271/273; 355/308; 399/367

(58) Field of Classification Search ................ 358/498, 358/497, 496, 474, 482, 483, 513–514; 399/372, 399/374; 271/242, 186, 273, 275, 274; 355/308, 355/309, 311

See application file for complete search history.

(56) References Cited

U.S. PATENT DOCUMENTS

| | | | | |
|---|---|---|---|---|
| 3,281,145 A | * | 10/1966 | Reilly | 271/262 |
| 4,743,974 A | * | 5/1988 | Lockwood | 358/494 |
| 4,935,766 A | * | 6/1990 | Kikukawa et al. | 396/166 |
| 4,935,786 A | * | 6/1990 | Veeder | 399/401 |
| 5,204,724 A | * | 4/1993 | Nakabayashi et al. | 399/361 |
| 5,982,400 A | * | 11/1999 | Yokoi et al. | 346/134 |
| 6,120,017 A | * | 9/2000 | Tanjo et al. | 271/105 |
| 6,388,775 B1 | * | 5/2002 | Chiu | 358/474 |
| 6,640,082 B2 | | 10/2003 | Mitomi | |
| 6,896,257 B2 | * | 5/2005 | Yamashita et al. | 271/242 |
| 7,130,077 B2 | * | 10/2006 | Takahashi et al. | 358/1.9 |

FOREIGN PATENT DOCUMENTS

| | | |
|---|---|---|
| JP | 1-110545 | 7/1989 |
| JP | 01-171360 | 7/1989 |
| JP | 2002-165059 | 6/2000 |
| JP | 2001-134717 | 5/2001 |
| JP | 2002-182437 | 6/2002 |
| JP | 01-293757 | 11/2002 |

OTHER PUBLICATIONS

"Imagio750/600 series" (with English-language translation), Tagaki, et al., RICOH Technical report, No. 28, pp. 14-26, Dec. 2002.

* cited by examiner

*Primary Examiner*—Edward L. Coles
*Assistant Examiner*—Negussie Worku
(74) *Attorney, Agent, or Firm*—Morgan, Lewis & Bockius LLP

(57) ABSTRACT

An image reader has a transport passage for transporting an original, a CIS for reading an image on the original transported on the transport passage, and a control member for pressing the transported original against an abutment member disposed at an opposed side of the transport passage at a read position of the CIS. The original does not slide on glass at the read position of the CIS and is moved with the original abutted against the abutment member of a chute on the opposed side, and image data is read in sequence.

9 Claims, 6 Drawing Sheets

IMAGE READER

The present disclosure relates to the subject matter contained in Japanese Patent Application No. 2002-199641 filed Jul. 9, 2002, which is incorporated herein by reference in its entirety.

BACKGROUND OF THE INVENTION

1. Field of the Invention

This invention relates to an image reader for reading an original image by an image sensor and the like, particularly to an image reader installing a CIS (Contact Image Sensor).

2. Description of the Related Art

Hitherto, an image reader for automatically reading image information on both sides of an original without the intervention of the user (automatic double-side reader) has been widely used as a reader of a copier, a facsimile, etc., or a scanner for computer input. As the automatic double-side readers, a method of reversing the side of an original in an original reversal section and reading image information is most widely adopted. That is, to input image information on both sides in the method in the related art, one side is read in an original read section and then the side of the ejected original is reversed and again is transported to the original read section for reading the other side.

However, in the automatic double-side reading by inverting the side, it is necessary to reverse the original after once being ejected and again transport the original to the original read section and thus it takes much time in reading both sides and the productivity is poor in reading both sides. The original reversal section requires a complicated mechanism to reverse the side of an original and the original jam occurrence percentage in the original reversal section is high as compared with other transport sections. Improving the reliability is required. Further, to design an automatic double-side reader that is placed in a narrow space, the necessity for inverting an original rapidly in a small diameter may occur because of the necessity for inverting the original and collating the pages of the original at the paper ejection time, etc. Consequently, it is difficult to transport an original of a predetermined cardboard having a large basis weight.

An art of automatically reading both sides in one transport is studied. For example, in JP-A-1-171360 and JP-A-1-293757, two image sensors are placed on both sides of an original path for transporting an original and both sides of an original can be read automatically in one original transport without reversing the side of the original.

Generally, to read an original, for example, a technique of applying light from a light source of a fluorescent lamp to the original and reading the reflected light by an optical sensor through a reduction optical system is adopted. As the sensor in the technique, for example, a one-dimensional CCD (Charge Coupled Device) sensor is used to process one line at a time. Upon completion of reading one line in the line direction (main scanning direction), the original is moved a minute distance in the direction orthogonal to the main scanning direction (subscanning direction) and the next line is read. This operation is repeated over the whole original size for completing reading of one page of the original. As a method of reading an original in order in the subscanning direction without moving the original, a method of moving a plurality of mirrors by a moving body such as a full-rate carriage or a half-rate carriage for reading an original in order in the subscanning direction is also available.

In the read technique, it is necessary to apply a light source to an original and reading the reflected light by a CCD sensor through several mirrors as described above and thus the whole unit tends to become large. Particularly, if a plurality of image sensors need to be placed to read both sides without reversing an original, it is difficult to place a plurality of CCD sensors because of a space problem. To solve the space problem, use of an image sensor called CIS (Contact Image Sensor) for directly reading an image by a linear sensor through a SELFOC lens using a small LED (Light Emitting Diode) as a light source is studied.

However, in the read technique using the CIS, the focal depth is very shallow and if the CIS and an original face go out of distance even a little, out-of-focus occurs and the read image becomes unclear. That is, it becomes hard to provide a sharp image although the whole unit can be reduced.

To lessen defocus as much as possible, conventionally, an original is pressed against a glass face disposed on CIS and is transported and the original pressed against the glass face is focused. However, if the original is pressed against the glass face and is transported, pencil carbon, ink, garbage, dirt, etc., are pressed against the glass face and rub the glass face, and are is easily deposited on the glass face. If the read image is output with the pencil carbon, ink, garbage, dirt, etc., deposited on the glass face, a black line in the original transport direction (subscanning direction) appears and measures against image quality trouble must be taken.

Further, to adopt both a scanner for applying a light source to an original and reading reflected light by a CCD sensor through several mirrors and a reader using a CIS and make it possible to read both sides of the original at the same time, the reader using a CIS is generally placed to direct downward and the glass thereof is placed on the upper side relative to an original transport passage. In such a case, the user cannot sufficiently clean the dirty glass surface. Particularly, if the glass face in the reader using a CIS cannot be opened because of the structure, it becomes difficult for the user to clean the glass surface.

SUMMARY OF THE INVENTION

It is therefore an object of the invention to control the attitude of a transported original at an image read section.

It is another object of the invention to suppress intimate contact of a transported original with a reader.

It is still another object of the invention to lessen dirt deposition on a reader.

An image reader incorporating the invention is characterized by the fact that an original is read by a CIS (Contact Image Sensor) with the original pressed against a chute on an opposed side without bringing the original into contact with a glass face placed in an original transport passage, thereby suppressing deposition of ink, etc., on the glass face and lessening the frequency of cleaning the glass surface, etc. That is, the image reader incorporating the invention comprises a transport passage for transporting an original, a CIS for reading an image on the original transported on the transport passage, and a control member for pressing the transported original against an opposed side of the transport passage at a read position of the CIS. However, the invention is not intended for completely preventing the original from being brought into contact with the glass face; when an original is read, control is performed so as to prevent the original from being brought into contact with the glass face as much as possible, and the lead, rear, etc., of the original is not completely prevented from coming in contact with the glass face.

The control member is characterized by the fact that it is projected from the CIS side of the transport passage toward the opposed side of the transport passage. More specifically, the spacing between a projection tip and the opposed side is 1 mm or less, and the member shaped like an ark, a square, etc., for example, is formed in the direction orthogonal to the original transport direction. Preferably, the projection is straight, but both end parts in the direction orthogonal to the original transport direction can also be made high as for the dimensions of the projection.

Further, the CIS is characterized by the fact that it is brought into focus assuming an original positioned on the opposed side of the transport passage. More specifically, for example, assuming that an original about 0.1 mm thick abuts the chute on the opposed side, adjustment is made so that the center point of the focus comes onto the original, for example. The CIS is characterized by the fact that it is placed with the sensor face pointing downward and acquires reflected light from an original passing through a light transmission member (for example, a glass member) placed at a midpoint in the transport passage.

From another aspect of the invention, an image reader incorporating the invention comprises read means for using reflected light from an original passing through a light transmission member to read an image on the original, original transport means for transporting the original so as to read the image by the read means with the original placed away from the light transmission member, and garbage storage means for storing garbage in the transport passage of the original transported by the original transport means.

That is, the original is transported with the original pressed against the opposed side of the light transmission member in the transport passage of the original by the original transport means and consequently, the original is brought away from the light transmission member at the position of the read means. Accordingly, it is made possible to solve many problems caused by the original read face coming in contact with the light transmission member.

DETAILED DESCRIPTION OF THE PREFERRED EMBODIMENTS

Referring now to the accompanying drawings, there is shown a preferred embodiment of the invention.

Figure 1:
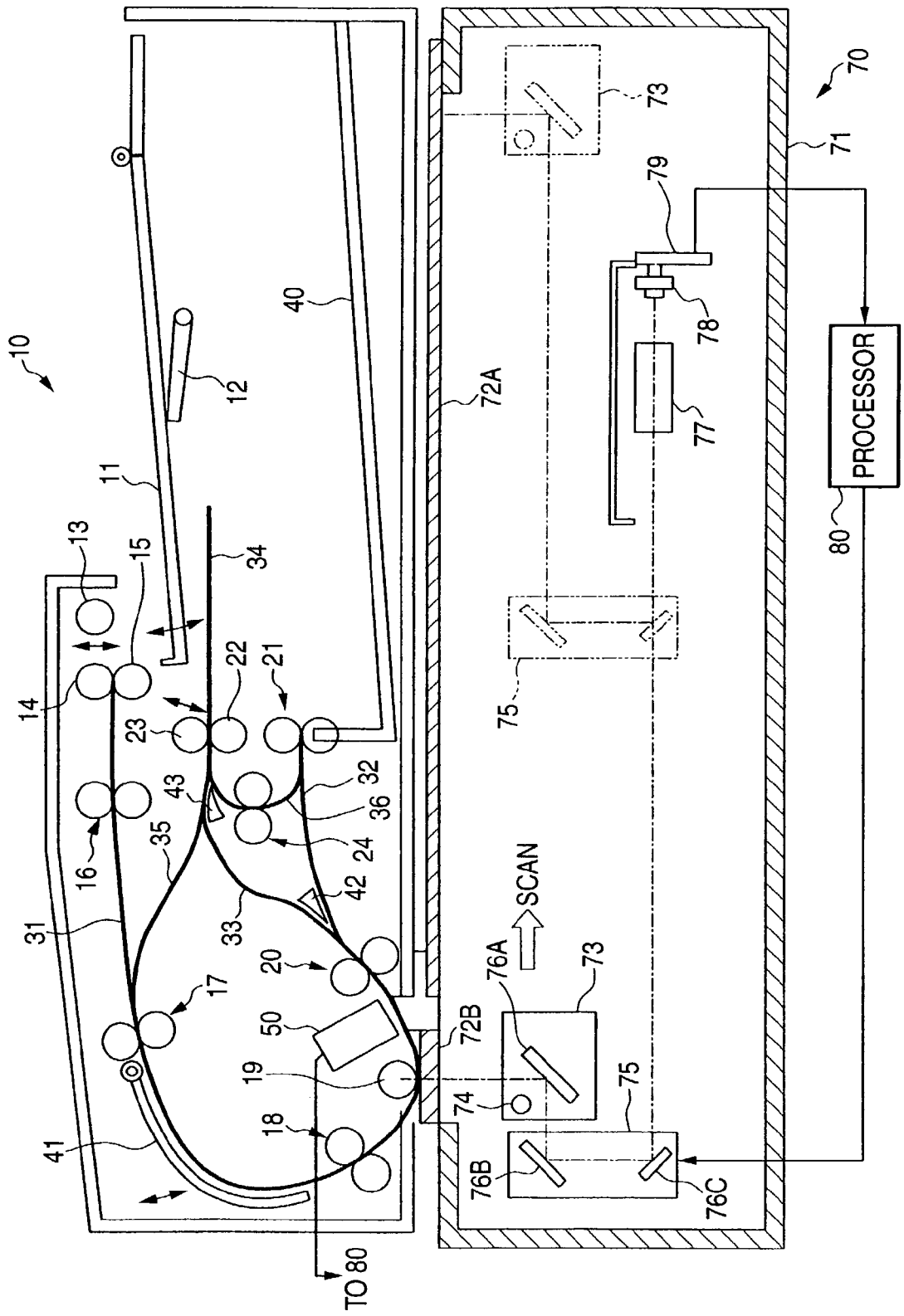
FIG. 1 is a drawing to show an image reader incorporating an embodiment of the invention.

FIG. 1 is a drawing to show an image reader incorporating an embodiment of the invention. The image reader includes an original feeder 10 for transporting originals in order from a stacked original bundle, a scanner 70 for reading an image by scanning, and a processor 80 for processing a read image signal.

The original feeder 10 comprises an original tray 11 for stacking an original bundle of a plurality of originals and a tray lifter 12 for moving up and down the original tray 11.

It also comprises a naja roll 13 for transporting an original on the original tray 11 moved up by the tray lifter 12, a feed roll 14 for transporting the original transported by the naja roll 13 further to a downstream point, and a retard roll 15 for handling the originals supplied by the naja roll 13 separately one by one. First, an original is fed to a first transport passage 31. Along with the first transport passage 31, there are a take away roll 16 for transporting the originals handled separately one by one to a downstream roll, a preregistration roll 17 for transporting the original further to a downstream roll and making a loop, a registration roll 18 for restarting rotation in timing after once stopping and supplying the original while performing registration adjustment for an original read section, a platen roll 19 for assisting in transporting the original being read, and an out roll 20 for transporting the read original furthermore downstream. The original feeder 10 also comprises a baffle 41 for rotating on a supporting point in response to the loop state of the transported original in the first transport passage 31. Further, the original feeder 10 comprises a CIS (Contact Image Sensor) 50 serving as a second sensor in this embodiment and disposed between the platen roll 19 and the out roll 20.

A second transport passage 32 and a third transport passage 33 are provided downstream from the out roll 20. The original feeder 10 comprises a transport passage switch gate 42 for switching the transport passages, an ejection tray 40 for stacking the read originals, and a first ejection roll 21 for ejecting the originals to the ejection tray 40. The original feeder 10 also comprises a fourth transport passage 34 for switching back the original passed through the third transport passage 33, an inverter roll 22 and an inverter pinch roll 23 being placed in the fourth transport passage 34 for actually switching back the original, a fifth transport passage 35 for again guiding the original switched back by the fourth transport passage 34 into the first transport passage 31 comprising the preregistration roll 17, etc., a sixth transport passage 36 for ejecting the original switched back by the fourth transport passage 34 to the ejection tray 40, a second ejection roll 24 being placed in the sixth transport passage 36 for transporting the reversed and ejected original to the first ejection roll 21, and an exit switch gate 43 for switching the fifth transport passage 35 and the sixth transport passage 36.

The naja roll 13 is lifted up and is held in a retreat position in a standby mode. When an original is transported, the naja roll 13 falls to a nip position (original transport position) and transports the top original on the original tray 11. The naja roll 13 and the feed roll 14 transport the original by joining of a feed clutch (not shown). The preregistration roll 17 makes the original lead abut against the registration roll 18 that is stopped for making a loop. When the loop is made, the original lead caught in the registration roll 18 is returned to the nip position. When the loop is formed, the baffle 41 opens with the supporting point as the center and functions so as not to interfere with the original loop. The take away roll 16 and the preregistration roll 17 hold the loop during reading. As the loop is formed, the read timing can be adjusted and a skew involved in transporting the original at the read time can be suppressed for enhancing the adjustment function of registration. The registration roll 18 which is stopped starts to rotate in the read start timing, the original is pressed against second platen glass 72B (described later) by the platen roll 19, and image data is read from the lower face direction.

At the termination time of reading a single-sided original or at the termination time of simultaneous reading both sides of a double-sided original, the transport passage switch gate 42 is switched so as to guide the original passed through the out roll 20 into the second transport passage 32 and eject the original to the ejection tray 40. At the sequential read time of a double-sided original, the transport passage switch gate 42 is switched so as to guide the original into the third transport passage 33 to reverse the original. At the sequential read time of a double-sided original, the inverter pinch roll 23 is retracted with feed clutch (not shown) off and nip is opened for guiding the original into the inverter path (fourth transport passage 34). Then, the inverter pinch roll 23 is nipped for guiding the original to be inverted to the preregistration roll 17 by the inverter roll 22 or transporting the original to be reversed and ejected to the second ejection roll 24 of the sixth transport passage 36.

The scanner 70 may comprise the above described original feeder 10 and supports the original feeder 10 on a unit frame 71 and reads an image of the original transported by the original feeder 10. The scanner 70 comprises on the unit frame 71 serving as a cabinet, a first platen glass 72A for placing the original whose image is to be read in a still state and a second platen glass 72B having an opening of light to read the original being transported by the original feeder 10.

The scanner 70 comprises a full-rate carriage 73 standing still below the second platen glass 72B and scanning over the whole of the first platen glass 72B for reading an image, and a half-rate carriage 75 for supplying light provided from the full-rate carriage 73 to an image coupling section. The full-rate carriage 73 comprises an illumination lamp 74 for applying light to an original and a first mirror 76A for receiving reflected light from the original. Further, the half-rate carriage 75 comprises a second mirror 76B and a third mirror 76C for supplying light provided from the first mirror 76A to an image formation section. Further, the scanner 70 comprises an image formation lens 77 for optically reducing an optical image provided from the third mirror 76C, a CCD (Charge Coupled Device) image sensor 78 for performing photoelectric conversion of the optical image formed through the image formation lens 77, and a drive board 79 comprising the CCD image sensor 78.

An image signal provided by the CCD image sensor 78 is sent through the drive board 79 to the processor 80.

To read the image of the original placed on the first platen glass 72A, the full-rate carriage 73 and the half-rate carriage 75 move in the scanning direction (arrow direction) in a 2:1 ratio. At this time, light of the illumination lamp 74 of the full-rate carriage 73 is applied to the read side of the original and reflected light from the original is reflected on the first mirror 76A, the second mirror 76B, and the third mirror 76C in order and is guided into the image formation lens 77. The light guided into the image formation lens 77 is formed on the light reception face of the CCD image sensor 78. The CCD image sensor 78 is a one-dimensional sensor for processing one line at a time. Upon completion of reading one line in the line direction (main scanning direction), the full-rate carriage 73 is moved in the direction orthogonal to the main scanning direction (subscanning direction) and the next line of the original is read. This operation is repeated over the whole original size for completing reading of one page of the original.

On the other hand, the second platen glass 72B is made of a transparent glass plate of a long plate-like structure, for example. The original transported by the original feeder 10 passes through on the top of the second platen glass 72B. At this time, the full-rate carriage 73 and the half-rate carriage 75 are in a stop state at the positions indicated by the solid lines. First, the reflected light on the first line of the original passed through the platen roll 19 of the original feeder 10 is formed on the image formation lens 77 through the first mirror 76A, the second mirror 76B, and the third mirror 76C, and the image is read by the CCD image sensor 78 of a first sensor in the embodiment. That is, the one line in the main scanning direction is processed at a time by the CCD image sensor 78 of a one-dimensional sensor and then the next line in the main scanning direction, of the original transported by the original feeder 10 is read. After the original lead arrives at the read position on the second platen glass 72B, the original passes through the read position on the second platen glass 72B. The read of one page over the subscanning direction is now complete.

In the embodiment, at the transport time of the original whose first side is read by the CCD image sensor 78 on the second platen glass 72B as the full-rate carriage 73 and the half-rate carriage 75 are stopped, the second side of the original can be read by the CIS 50 of a second sensor at the same time (which means almost the same original transport time rather than the complete time match). That is, the CCD image sensor 78 of the first sensor and the CIS 50 of the second sensor make it possible to read images on both sides of the original as the original is once transported to the transport passage.

Figure 2:
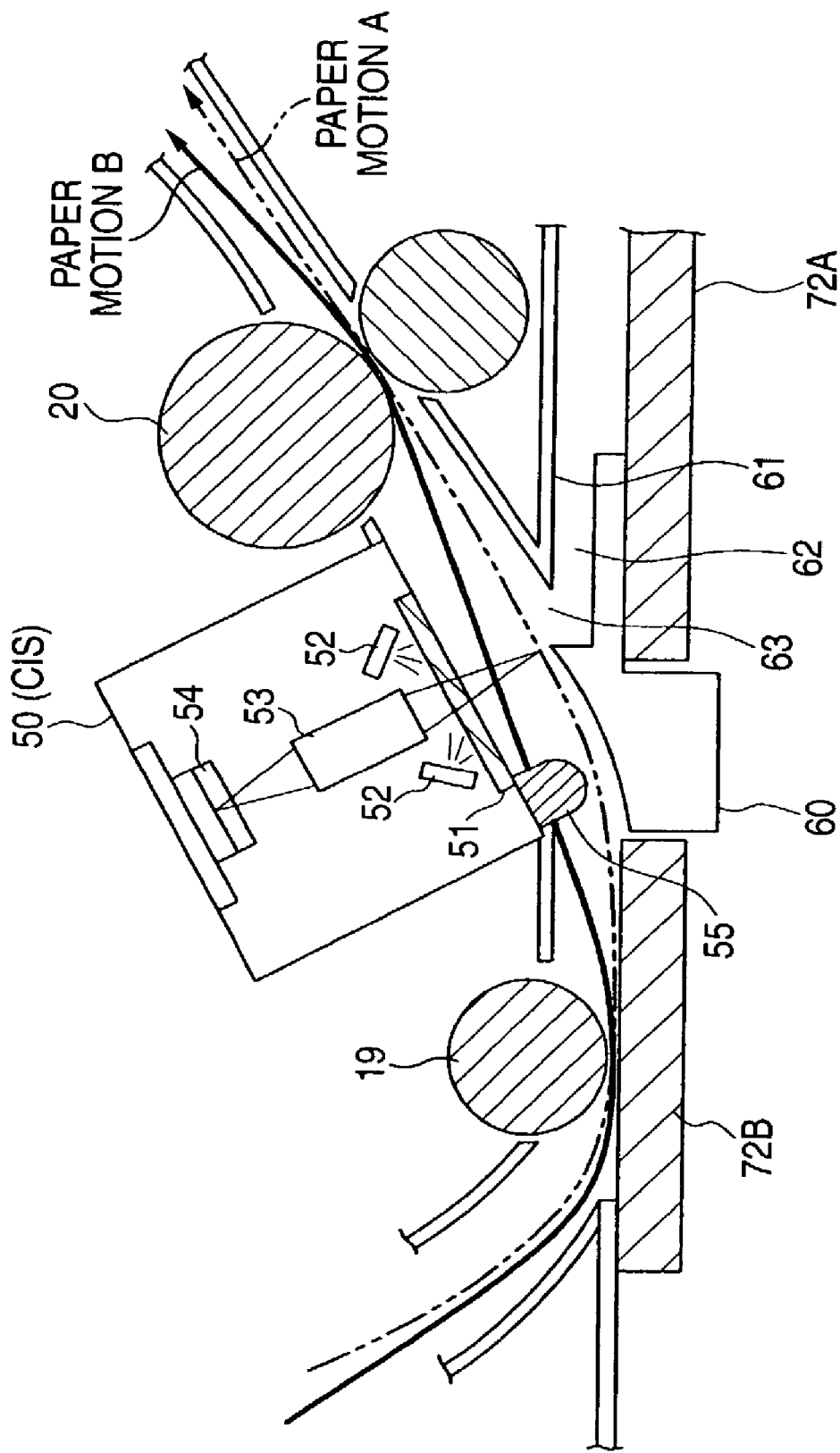
FIG. 2 is a drawing to describe the read structure using a CIS.

FIG. 2 is a drawing to describe the read structure using the CIS 50. As shown in FIG. 2, the CIS 50 is placed between the platen roll 19 and the out roll 20. One side (first side) of an original is pressed against the second platen glass 72B and the image on the first side is read by the CCD image sensor 78. On the other hand, in the CIS 50, the image on the other side (second side) is read from the opposed side with respect to the transport passage transporting the original. The CIS 50 comprises glass 51 of a light transmission member, LEDs (Light-Emitting Diodes) 52 for applying light to the second side of the original through the glass 51, a SELFOC lens 53 of a lens array for gathering reflected light from the LEDs 52 passing through the glass 51, and a line sensor 54 of an image sensor for reading the light gathered through the SELFOC lens 53 as a contact optical unit. As the line sensor 54, a CCD or CMOS sensor, a contact sensor, etc., can be used, and an image of actual width (for example, A4 length width 297 mm) can be read. Since the CIS 50 reads the image using the SELFOC lens 53 and the line sensor 54 without using a reduction optical system, the structure can be simplified, the cabinet can be miniaturized, and the power consumption can be decreased. To read a color image, as the LEDs 52, three color LED light sources of R (red), G (green), and B (blue) may be used in combination and as the line sensor 54, a set of three rows of sensors for three color of RGB may be used.

For the CIS 50 to read an image, the transport passage forming the read section is provided with a control member 55 extended from the cabinet of the CIS 50 and an abutment member 60 of an opposed side chute for abutting paper pressed by the control member 55. A guide member 61 is placed downstream from the abutment member 60 and an opening 63 is made between the guide member 61 and the abutment member 60. Further, a garbage dump section 62 for accumulating garbage and dust deposited on the surface of the original is placed at a position contiguous to the opening 63, below the guide member 61. The control member 55 and the abutment member 60 are placed corresponding to the position of the transport passage from the front to the rear of the original feeder 10 in the direction orthogonal to the transport passage of the original (namely, in the direction from the front to the rear of the original feeder 10).

Figure 3:
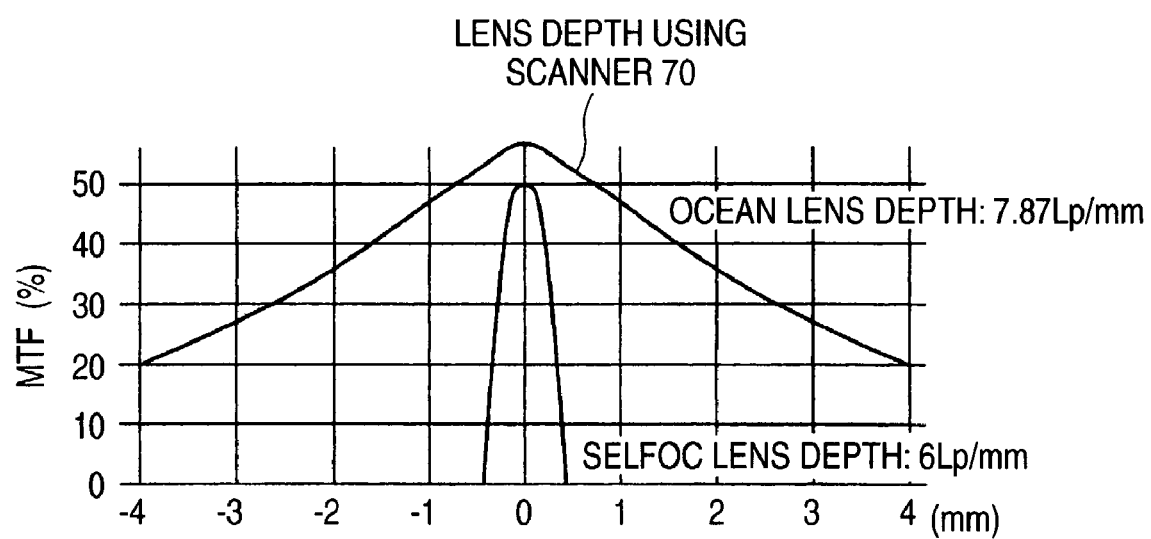
FIG. 3 is a drawing to describe a focal depth as lens image formation performance.

Since the CIS 50 adopts the SELFOC lens 53 as the optical image formation lens, the depth of focus (field) is deep. FIG. 3 is a drawing to describe the focal depth as lens image formation performance. The figure shows examples of MTF (Modulation Transfer Function) of the lens depth (7.8 Lp/mm) using a reduction optical system of the scanner 70, etc., in the embodiment and MTF of the lens depth (6 Lp/mm)

using the SELFOC lens 53. The term "Lp/mm" is a value indicating how many ladder patterns of black and white exist per mm. The MTF indicates how spatial information (contrast) of a subject is faithfully reproduced from a low frequency band (coarse cells) to a high frequency band (fine cells) as frequency characteristics. The vertical axis in FIG. 3 indicates the MTF (%) and the horizontal axis indicates the state 1 mm at a time brought apart from the best pint position on the platen glass, etc., and the state 1 mm at a time brought close to the best pint position.

For example, when an original is read, if MTF 20% or more is a target, to use the scanner 70 in the embodiment, the scanner comes into given focus and the depth of field can be taken large even about ±4 mm. On the other hand, to use the SELFOC lens 53, if MTF 20% or more is a target, the depth of field is narrow as about ±10.3 mm and is about $\frac{1}{13}$ or less as compared with the case where the scanner 70 is used. That is, for the CIS 50 to read an image in the embodiment, the original read position needs to be placed in a predetermined narrow range.

In the embodiment, the control member 55 is placed upstream of the original transport passage relative to the read position of the CIS 50 for pressing the original against the abutment member 60 for transporting the original, so that the attitude of the original between the platen roll 19 and the out roll 20 can be controlled stably. "Paper motion B" indicated by the solid line arrow in FIG. 2 indicates motion of paper if the control member 55 does not exist, and "paper motion A" indicated by the chain double-dashed line arrow indicates motion of paper when the control member 55 is provided. It can be seen from "paper motion A" that the original is pressed against the abutment member 60 and is transported. That is, in the image reader comprising the CIS 50 of the read section of a second side placed between the second platen glass 72B (platen roll 19) of the read section of a first side and the out roll 20, the control member 55 is placed in the proximity of the CIS 50 of the optical system for reading the second side to suppress an original position shift until the original rushes into the read section of the first side and is caught in the out roll 20. The control member 55 is placed so that the attitude of the original after being caught in the out roll 20 is brought close to the position of the original before being caught in the out roll 20 (height from the CIS 50).

Thus, the transported original is read with the CIS 50 focusing in the state in which the original is pressed against the abutment member 60 by the control member 55, whereby incomplete focusing when the CIS 50 of shallow depth of field is used is improved. More specifically, the average thickness of paper of original is set to 0.1 mm, for example, and the CIS 50 focuses (the focal position comes) at the position bringing close by the original thickness (for example, 0.1 mm) from the abutment member 60. Accordingly, if the original is transported without sliding the original read side over the glass 51, it is made possible to read the second side of the original in a desirable state for the resolution characteristic.

When the original is run, garbage or dirt deposited on the surface of the original may appear as a black line on the image output. That is, if the original is transported in intimate contact with the original transport passage of the glass 51 of the CIS 50, for example, pencil carbon, ink, garbage, dirt, etc., is pressed against the glass face, is rub against the transport passage side surface of the glass 51, and is easily deposited thereon. If an image is read and output with the pencil carbon, ink, garbage, dirt, etc., deposited on the glass 51 (for example, the original is copied), the deposit portion appears as a black line in the original transport direction (subscanning direction), causing image quality trouble to occur. As shown in FIG. 2, the CIS 50 is disposed above the original transport passage and is placed with the surface of the glass 51 of the read face pointing downward. For example, if the read face points upward as with the second platen glass 72B, for example, the original feeder 10 is opened from the scanner 70 and the platen roll 19 is released from the second platen glass 72B, so that the read face can be cleaned easily. However, the CIS 50 is placed pointing downward and thus the original transport face of the glass 51 points downward. Even if the original feeder 10 can be opened, it is difficult to clean the read face. In the embodiment, the original is transported with the original pressed against the abutment member 60 by the control member 55, so that the original is not transported in the state in which the original is in intimate contact with the glass 51, as described above. Consequently, depositing ink, garbage, dirt, etc., on the original face on the surface of the glass 51 can be suppressed and damage of a black line, etc., can be lessened.

Further, the abutment member 60 shown in FIG. 2 is molded by resin such as ABS, and also serves as a positioning member for positioning an original, such as a book original, placed on the first platen glass 72A, and the face forming the transport passage guides the original into the read section of the CIS 50.

The control member 55 of a protrusion may have a vertex (convex protrusion) shaped like an ark or shaped like a square and is formed of a mold member such as polyacetal. The optimum shape and material for transporting an original are selected. For example, a polyester film such as Mylar (produced by DuPont) may be rounded to form the control member 55. As shown in FIG. 2, the control member 55 is placed at a position not covering the illumination optical path so as not to interfere with light application of the LED 52 or reflected light. Further, considering transporting an original about 0.1 mm thick and the positioning function of the read position, preferably the dimension (spacing) between the control member 55 and the abutment member 60 is 1 mm or less. If both end parts of the control member 55 in the direction orthogonal to the original transport direction are made higher than the center for making the dimension between the control member 55 and the abutment member 60 at both end parts narrower than that at the center, it is made possible to press the original against the abutment member 60 in a tight state. For example, letting the height of both end parts be "a" and the height of the center be "a'", "a" minus "a'" can be set to about 0.5 mm. The abutment projection (convex protrusion) of the control member 55 is set so as to become a length (width) of 300 mm or more in the direction orthogonal to the original transport direction, for example, to control the transport position shift relative to the original of the maximum original width that can be transported.

Further, in the embodiment, when an original rushes into the guide member 61, garbage is scraped up and garbage deposited when the original is run is accumulated in the garbage dump section 62 through the opening 63, whereby the garbage deposition amount on the original again transported with the side reversed, for example, can be decreased. In the embodiment, as described above, the state in which the original is transported with the original pressed against the surface of the glass 51 is lessened, so that garbage deposition on the glass 51 is largely lessened as compared with general units. However, garbage, etc., may be deposited on the glass 51 because of electrostatic attraction, etc., even if noncontact is made. It is hard to completely prevent depositing of light-weight suspended matter of paper dust, flue, etc., for example. To lessen garbage deposition on the surface of the glass 51 as much as possible, garbage is scraped off from the original by the abutment member 60 and is accumulated in the garbage dump section 62 through the opening 63, whereby it is made possible to reduce the amount of garbage existing on the transport passage.

Figure 4:
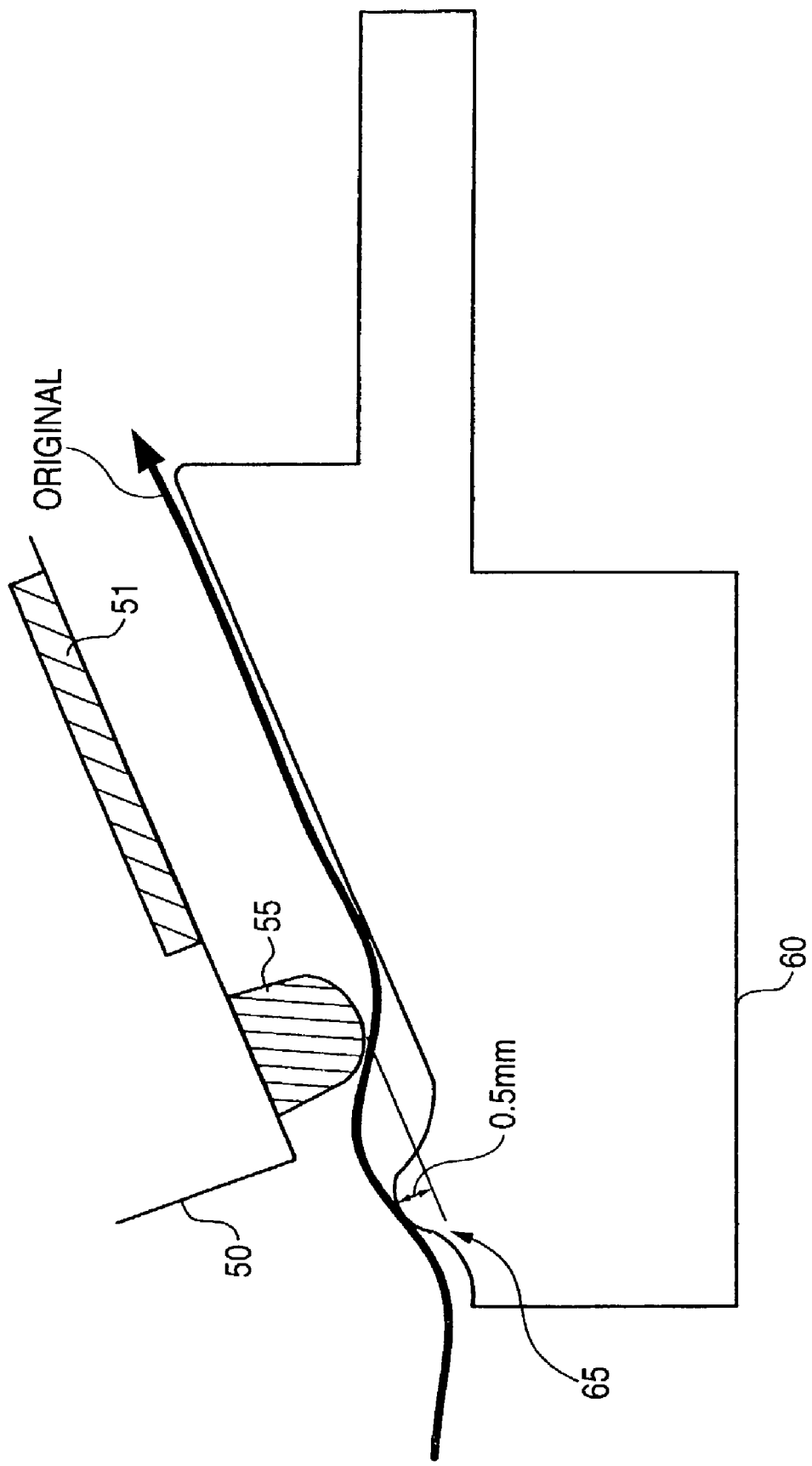
FIG. 4 is a drawing to show a structure for waving an original like a letter S before a second side of the original is read by the CIS.

As a modification of the embodiment, it is also possible to place a protrusion as shown in FIG. 4 on the original transport passage. FIG. 4 is a drawing to show a structure for waving an original like a letter S before a second side of the original is read by the CIS 50. Here, the abutment member 60 is formed with an S letter forming protrusion 65 in the direction orthogonal to the original transport direction. As shown in FIG. 4, the height of the S letter forming protrusion 65 has a lap of about 0.5 mm with the control member 55 of the protrusion on the opposed side. Preferably, the lap is 0.5 mm or less considering resistance of original transport. The S letter forming protrusion 65 and the control member 55 are used to temporarily wave the original like an S letter, whereby flap of the original when the original rushes into the read position of the CIS 50 is lessened and when the second side of the original is read by the CIS 50 using the lens of shallow depth of field, it is made possible to improve the resolution characteristic.

Next, the processor 80 shown in FIG. 2 will be discussed.

Figure 5:
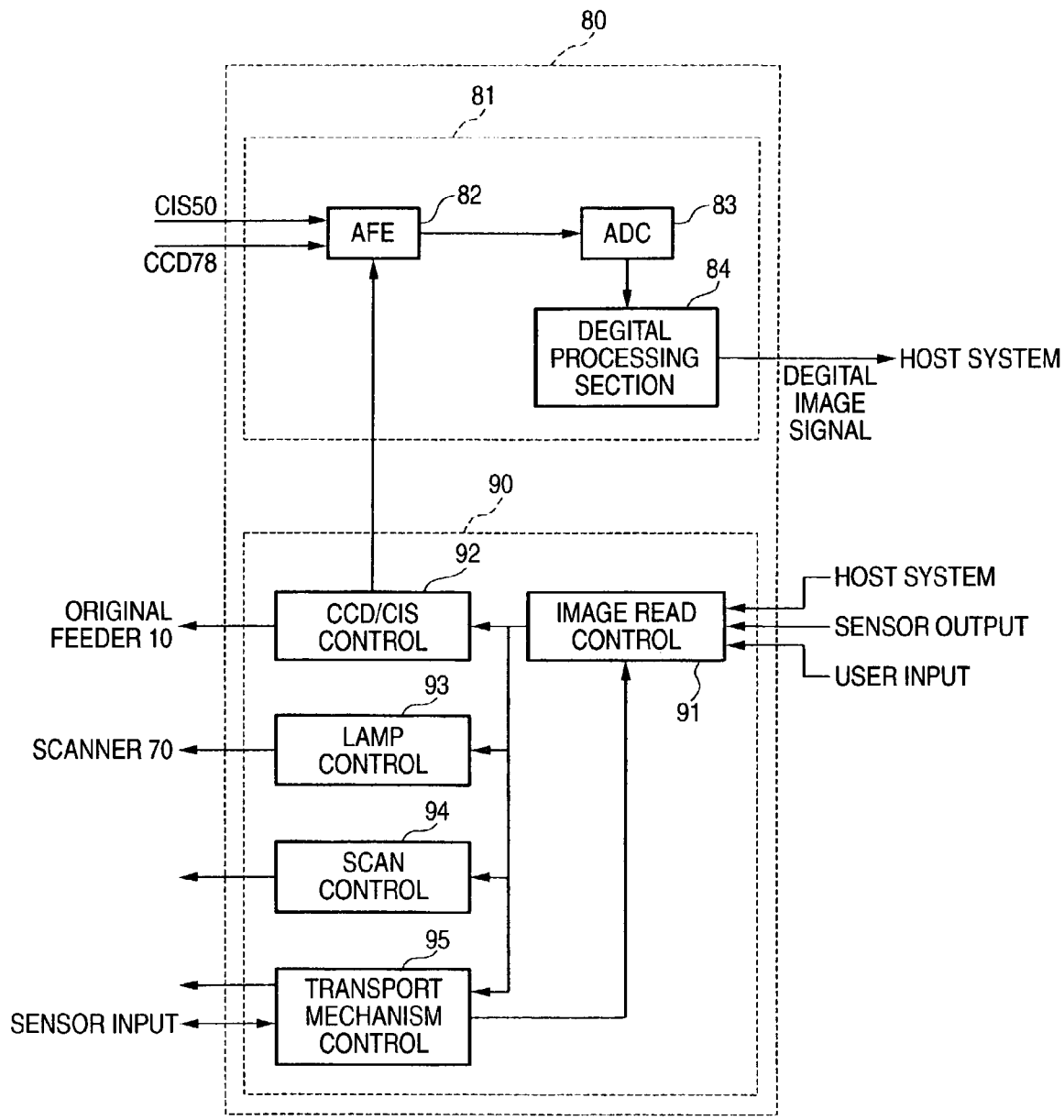
FIG. 5 is a block diagram to describe a processor.

FIG. 5 is a block diagram to describe the processor 80. The processor 80 incorporating the embodiment of the invention comprises a signal processing section 81 for processing image information provided by the sensors (CCD image sensor 78 and line sensor 54) and a control section 90 for controlling the original feeder 10 and the scanner 70. The signal processing section 81 comprises an AFE (Analog Front End) 82 for processing an analog signal, an ADC (Analog to Digital Converter) 83 for converting the analog signal into a digital signal, and a digital processing section 84 for performing various types of processing of shading correction, offset correction, etc., for the digital signal. The digital signal processed by the digital processing section 84 is output to a host system and, for example, is output to a printer as image information.

The control section 90 comprises an image read control 91 for controlling the whole of the original feeder 10 and the scanner 70 including control of double-side read, control of single-side read, etc., a CCD/CIS control 92 for controlling the CCD image sensor 78 of the first sensor and the CIS 50 of the second sensor, a lamp control 93 for controlling the LEDs of the CIS 50 and the illumination lamp 74 of the full-rate carriage 73 in read timing, a scan control 94 for turning on/off a motor in the scanner 70 for controlling the scan operation with the full-rate carriage 73 and the half-rate carriage 75, and a transport mechanism control 95 for controlling a motor in the original feeder 10 and controlling the operation of the rollers, the operation of the feed clutch, the gate switch operation, etc. Control signals are output from the controls to the original feeder 10 and the scanner 70, and the operation control is made possible based on the control signals. The image read control 91 sets the read mode based on the control signal from the host system, sensor output detected in an automatic selection read function, for example, user's selection, etc., and controls the original feeder 10 and the scanner 70.

In the embodiment, when an image is read as an original is transported by the original feeder 10, the original transported via the second platen glass 72B to the platen roll 19 can be read using the scanner 70 (CCD image sensor 78) and can also be read using the CIS 50 placed in the original feeder 10. However, as described above, read of the CCD image sensor 78 using the mechanism of the scanner 70 and read using the SELFOC lens 53 of the CIS 50 differ in focal depth, and becomes different in resolution characteristic. Particularly, to read a color image of a photo, etc., it becomes difficult to perform color matching in both the reads and the image qualities provided in both the reads become different. Then, for example, a plurality of read modes are provided for making it possible to select the optimum mode for reading a double-side original based on the setup state of the unit, the original type, user's selection, etc.

Figure 6:
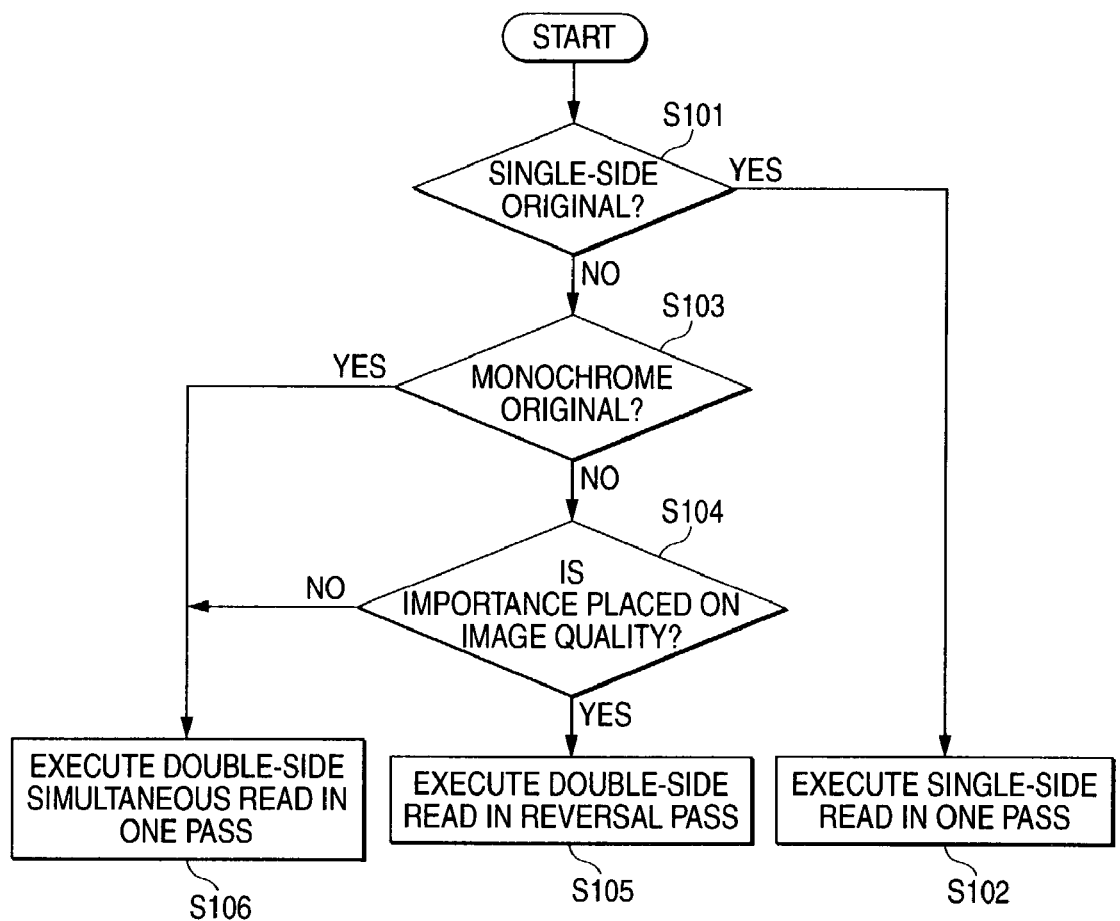
FIG. 6 is a flowchart to show an example of processing executed by an image read control.

FIG. 6 is a flowchart to show an example of processing executed by the image read control 91 shown in FIG. 5. The image read control 91 first determines whether or not the original to be transported is a single-side original (step 101). This determination can be made based on selection of the user using a control panel (not shown) placed on the scanner 70, sensors (not shown) placed on both sides of the first transport passage 31 before an image is read, for example, if the automatic selection read function works, etc. A request from the host system, selection of the user through a network, etc., is also possible. If it is determined at step 101 that the original is a single-side original, single-side read in one pass (only one original transport pass using no reversal pass) is performed (step 102). In the single-side read in one pass, either of read of the CCD image sensor 78 and read of the CIS 50 may be selected; however, to realize image read of higher image quality, preferably read of the CCD image sensor 78 is selected. In such a case, the original is placed so that the single-side original portion exists upward on the original tray 11 and the first page of the original comes on the top of the original tray 11, and the original is transported starting at the first page and the pages are read in order.

If it is not determined at step 101 that the original is a single-side original, namely, if the original is a double-side original, whether or not the original is a monochrome original is determined (step 103) based on selection of the user or the automatic selection read function as at step 101. Even if the original is a color original, the user may want to read the original in monochrome. Not to perform monochrome read, namely, to perform color read, whether or not importance is placed on the image quality is determined (step 104). For example, as for a color image of a color photo, pamphlet, etc., generally importance is placed on the image quality rather than productivity of raising the read speed. The determination is also made based on user's setting, etc. If it is determined at step 104 that importance is placed on the image quality, double-side read in a reversal pass of a first double-side read mode is executed (step 105). That is, both the first and second sides of the original are read by the CCD image sensor 78 of the first sensor without being read by the CIS 50. Accordingly, it is made possible to read both the first and second sides of the original with high image quality using the read means of deep focal depth.

On the other hand, if it is determined at step 103 that monochrome read is executed or if importance is not much placed on the image quality and is placed on any other factor such as productivity, double-side simultaneous read in one pass using no reversal pass, of a second double-side read mode is executed (step 106). For example, although color image output is required at step 104, in case of business color in which importance is not placed on delicate tint or in case of plus one color (in addition to black, any other one color of red, blue, etc., is contained), the second double-side read mode is executed. That is, the first side is read by the CCD image sensor 78 of the first sensor and in the transport passage of the read, the second side is read by the CIS 50 in the same transport passage. Thus, the need for twice transporting the original to the same read section is eliminated, the original read speed can be increased, and the transport passage is simplified, so that original transport trouble of an original jam, etc., can be suppressed. As described above, "simultaneous read" does not necessarily means time match and means reading of both sides at almost the same time in one pass.

The processing flow shown in FIG. 6 can also be simplified in double-side original read. To read a monochrome original the double-side simultaneous read at step 106 is executed, and to read a color original the original is read in order in a reversal passage at step 105. The modes can also be mixed for use in response to the original side type.

As described above in detail, according to the embodiment, when an original is read using the CIS 50 of a contact optical unit such as a contact image sensor, for example, the control member 55 containing the convex protrusion, etc., is placed on the original transport passage and the original is pressed against the abutment member 60 of an opposed side chute for reading the original. That is, the image reader comprises the transport passage for transporting an original, the CIS 50 for reading an image on the original transported on the transport passage, and the control member 55 for pressing the transported original against the abutment member 60 on the opposed side of the transport passage at the read position of the CIS 50. The original does not slide on the glass 51 and is not moved at the read position of the CIS 50 and is moved with the original abutted against the abutment member 60 of the chute on the opposed side, and image data is read in sequence. Setting is made so that the best focus is obtained as the read position of the CIS 50 with the original pressed against the abutment member 60. Accordingly, if a contact optical unit of shallow depth of field is used, it is made possible to lessen variations in original positions, and the resolution characteristic can be improved.

The original is transported with the original pressed against the abutment member 60 of the chute on the opposed side, so that the state in which the original comes in contact with the surface of the glass 51 of the CIS 50 can be lessened. Consequently, dirt on the original transport passage surface of the glass 51 can be suppressed and image quality failure caused by the dirt can be decreased. Particularly, if a technique of focusing on the surface of the glass 51 and reading an original is adopted, the original face slides on the surface of the glass 51 and moves and thus ink, etc., is easily deposited. However, according to the embodiment, the original is transported with the original pressed against the abutment member 60 of the chute on the opposed side by the control member 55, so that deposition of ink, etc., can be reduced largely.

Further, in the embodiment, the garbage dump section 62 is placed on the side of the abutment member 60 of the chute on the opposed side, and a part of garbage scraped off in the abutment member 60 is removed from the top of the original transport passage. Accordingly, it is made possible to reduce the amount of garbage existing on the original transport passage and suppress dirt on the glass 51, etc.

Thus, according to the invention, the attitude of the transported original can be controlled and dirt deposition on the reader can be lessened.

What is claimed is:

1. An image reader, comprising:
    a read unit for using light reflected from an original, to read an image on the original, the light being transmitted by a light transmission member; and
    an original transport unit directly attached to and extending from the read unit for transporting the original so as to read the image by the read unit with the original placed away from the light transmission member,
    wherein the original transport unit presses the original against an opposed side of the light transmission member with respect to a transport passage of the original at a read position of the read unit wherein the support member is disposed extending toward an upstream side of the transport passage with respect to the original transport unit.

2. The image reader as claimed in claim 1, further comprising a garbage storage unit for storing garbage, the garbage storage unit being disposed in a transport passage of the original transported by the original transport unit.

3. An image reader, comprising:
    a first read unit for using light reflected from a first side of an original to read an image on the original, the light being transmitted by a light transmission member;
    a second read unit for using light reflected from a second side of the original to read an image on the original, the light being transmitted by the light transmission member; and
    an original transport unit directly attached to and extending from the second read unit for transporting the original so as to read the image by the read unit with the original placed away from the light transmission member and an abutment unit that faces the second read unit for abutting the original pressed by the original transport unit, wherein the abutment unit is disposed extending toward an upstream side of the transport passage with respect to the original transport unit, and the abutment unit abuts the original against the original transport unit.

4. The image reader as claimed in claim 3, wherein said original transport unit extends from the second read unit in a direction orthogonal to a transport passage of the original at the second read unit.

5. The image reader as claimed in claim 3, further comprising an abutment unit for abutting the original pressed by the original transport unit.

6. The image reader as claimed in claim 5, wherein the abutment means further comprises a protrusion unit extending toward the second read unit in a direction orthogonal to a transport passage of the original at the second read unit.

7. The image reader as claimed in claim 6, wherein the protrusion unit further comprises a S-shape.

8. The image reader as claimed in claim 6, wherein the original transport unit and the protrusion unit lap each other in the direction orthogonal to the transport passage of the original at the second read unit.

9. The image reader as claimed in claim 6, wherein the original transport unit and the protrusion unit lap each other by 0.5 mm or less.

\* \* \* \* \*